A. NOVOMIROFF.
EXTENSIBLE SPURRED WHEEL.
APPLICATION FILED MAY 20, 1919.
1,324,563.
Patented Dec. 9, 1919.
2 SHEETS—SHEET 1.
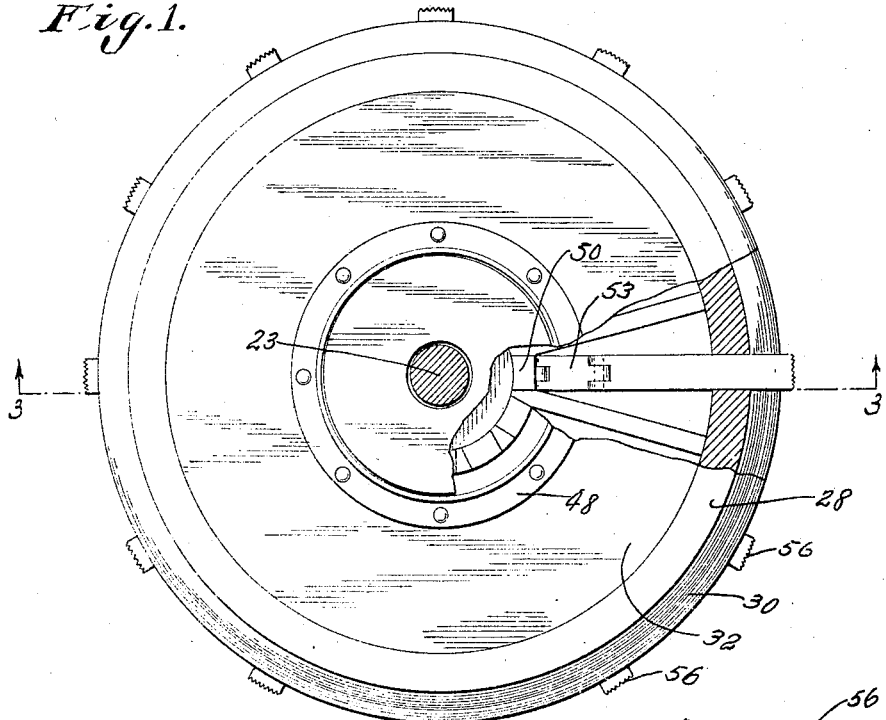
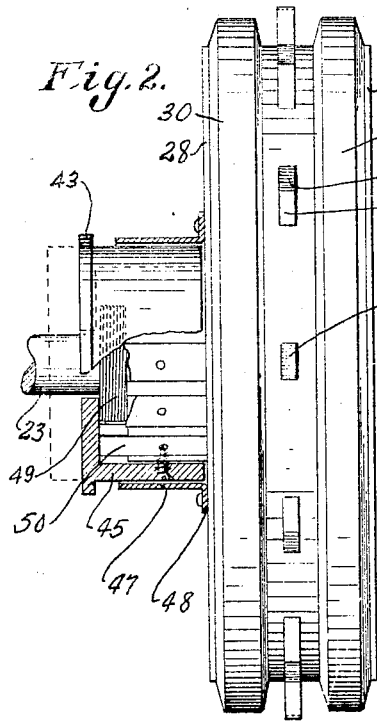
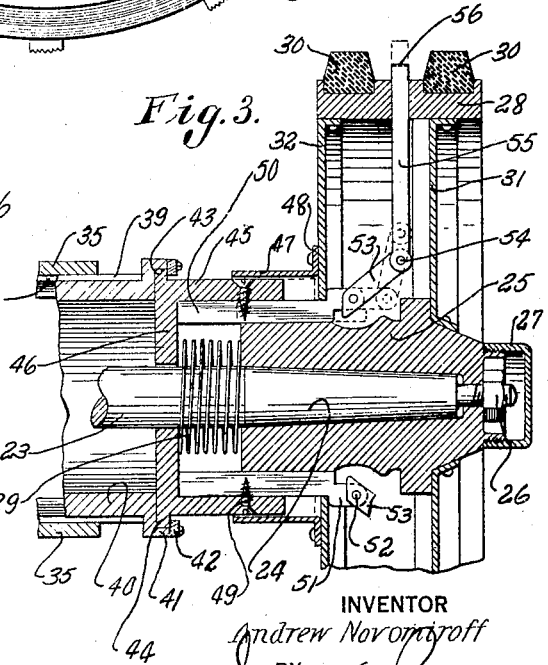
INVENTOR
Andrew Novomiroff
BY
Adam E. Lohat
ATTORNEY

A. NOVOMIROFF.
EXTENSIBLE SPURRED WHEEL.
APPLICATION FILED MAY 20, 1919.

1,324,563.

Patented Dec. 9, 1919.
2 SHEETS—SHEET 2.

INVENTOR
Andrew Novomiroff
BY
ATTORNEY

UNITED STATES PATENT OFFICE.

ANDREW NOVOMIROFF, OF NEW YORK, N. Y.

EXTENSIBLE SPURRED WHEEL.

1,324,563.　　　　　Specification of Letters Patent.　　　Patented Dec. 9, 1919.

Application filed May 20, 1919. Serial No. 298,562.

*To all whom it may concern:*

Be it known that I, ANDREW NOVOMIROFF, a citizen of Russia, residing at 356 2nd Ave., New York, county of New York, and State of New York, have invented certain new and useful Improvements in Extensible Spurred Wheels, of which the following is a specification.

This invention relates to improvements in vehicle wheels, and particularly to types used for trucks, automobiles and the like, such wheels being provided with cushion treads made of rubber or like elastic material.

The principal object of the invention is to provide a wheel in which a plurality of spurred elements may be projected outwardly between the tread elements so as to contact with the surface over which the wheel is passing, preventing skidding and side slipping and providing an efficient grip upon the surface when it is desired.

A further object is to provide means whereby the spurs may be retracted under ordinary conditions so that the cushion treads act in the ordinary manner, the operation of projecting or retracting the spurs being controlled by a single lever arranged conveniently for the driver of the vehicle.

These and other like objects are attained by the novel construction and combination of parts hereinafter described and shown in the accompanying drawings, forming a material part of this specification and in which:

Figure 1 is a side elevational view showing a wheel made in accordance with the invention, the spurs being projected and parts being broken away in order to disclose the construction.

Fig. 2 is a front elevational view of the same.

Fig. 3 is a fragmentary transverse sectional view taken on line 3—3 of Fig. 1.

Figure 4:
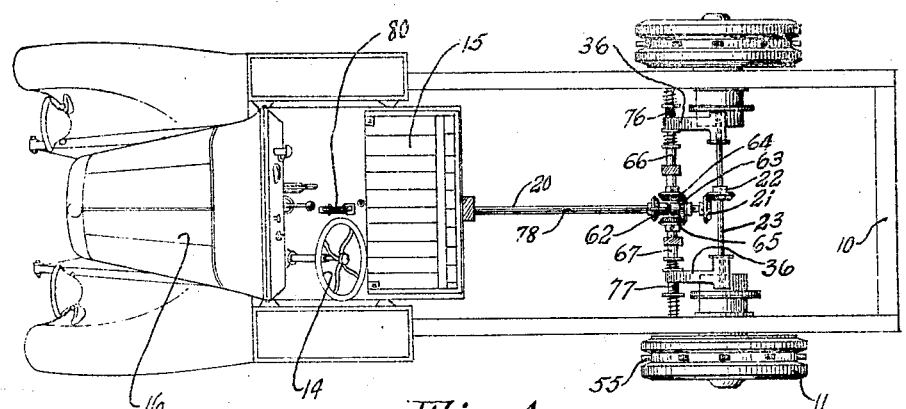
Fig. 4 is a plan view illustrating the application of the invention.
Figure 5:
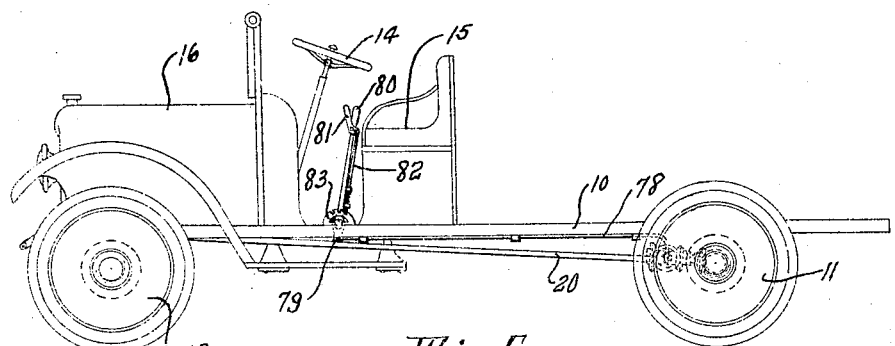
Fig. 5 is a side elevational view of the same.
Figures 6, 7:
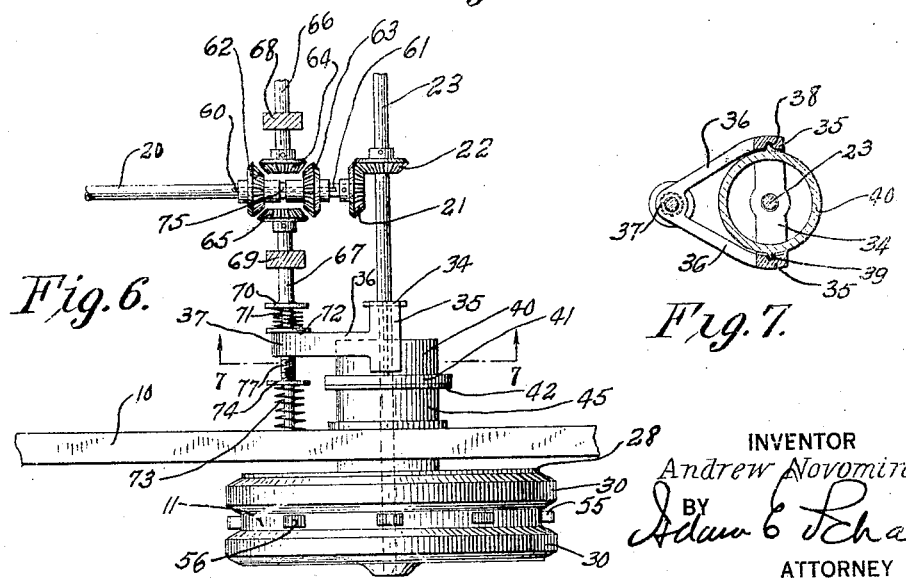
Fig. 6 is an enlarged fragmentary top plan view of the skid operating means.
Fig. 7 is a transverse sectional view taken on line 7—7 of Fig. 6.

Referring to the drawings, a conventional type of chassis frame 10, rests upon rear wheels, generally designated by the numeral 11, and provided with dirigible front wheels 12 as is common, the same being steered by a hand wheel 14 convenient to the driver's seat 15, the apparatus being propelled by an engine contained within the casing 16. This engine or motor is coupled to actuate a longitudinally disposed drive shaft 20, extending below the floor of the chassis, and having at its end a bevel gear 21, meshing with a mating gear 22, fixed upon the rear axle shaft 23.

This shaft is here shown to terminate in conical ends 24, fitted to the hubs 25, and held therein by the clamp nuts 26, provided with nut caps 27.

A rim or felly 28 is provided with a pair of annular recesses adapted to receive the cushion treads 30. The rim 28 is held circumjacent to the hub 25 by means of a flanged disk 31, securely bolted at its inner and outer edges respectively to the hub and rim, a similar flanged disk 32 being arranged upon the inner side of the wheel, these disks being imperforate and taking the place of spokes usually employed.

Plates 34 are rotatably mounted upon the axle 23 these plates terminating in longitudinally disposed elements 35, from which extend transverse arms 36, terminating in a hub 37, so arranged as to prevent the plate 34 from rotating as will be farther on described.

Formed interiorly of the elements 35 are grooves 38, receptive of key-like elements 39, extending outwardly beyond the periphery of sleeves 40, having raised annular extensions 41, upon the outer surface of which are rings 42, forming between them and the sleeves 40 annular recesses 43 adapted to receive the flanged ends 44, of other sleeves 45, having web portions 46, containing openings through which the axle 23 passes, the hub 25 being pressed outward from the web 46 by a coiled compression spring 29.

Surrounding the inner open ends of the sleeves 45 are rings 47, secured by flanged feet 48 to the inner disks 32, the rings 47 acting as dust guards to prevent the entrance of dirt to the interior of the wheel.

Secured by screws 49 to the interior of the sleeve 45 are a plurality of bars 50 slidable in suitable slots or recesses formed in the hubs 25, the inner ends 51 of the bars being offset, and pivotally engaged thereto by the pins 52 are links 53, pivoted at their outer, free ends by pins 54, with bars 55 extending outward through rectangular openings formed centrally in the rim 28 between the cushion treads 30, the extending ends of the bars being provided with spurs or serrations 56 adapted to make contact with the surface.

From the foregoing it will be seen that if the sleeve 40 is moved outward, or toward the hub, the inner sleeve 45 is moved with it, the sleeve 45 rotating in the recess 43, together with the hub 25, and other portions of the wheel, the two positions being shown respectively in Figs. 2 and 3, likewise, due to the movement of the bars 50, and link connections 53, the bars 55 may be extended or retracted in an obvious manner.

The spurred bars are operated as follows:—

Slidably secured by keys 60 and 61, set in the shaft 20, are bevel gears 62 and 63, either of which is engageable with other gears 64 and 65, fixed upon the ends of shafts 66 and 67 extending in opposite directions at right angles to the shaft 20 and guided in bearings 68 and 69.

Fixed upon each of the shafts 66 and 67 are annular flanges 70, compressing springs 71 between loose collars 72, one of which abuts against the hub 37, while other loose collars 74, at the outer end of the shaft are adapted to compress springs 73, held in position on the extreme outer end of the shafts, both of these shafts are screw-threaded near their outer ends 76 and 77, these threads engaging within the hub 37 so that when rotary motion is conducted to either of the shafts 76 and 77, the hub and attached parts are moved rectilinearly of of the shaft. These hubs normally run free on the unthreaded portion of the shaft adjacent to either of its ends and which are pressed into contact therewith when the shaft is rotated in proper direction by means of the coiled springs.

Engaged with the hubs of the gears 62 and 63, in the annular recess 75, central therebetween, are forks formed at the termination of a rod 78 extending toward the front of the machine, and engaged with a lever 79, the longer upper end 80 of which may be readily actuated by an operator upon the seat 15, the lever being provided with a detent 81, the rod 82 of which extends downward and engages in a toothed segment 83, fixed upon the flooring of the car.

Thus, as the lever 80 is moved to a forward position the gear 62 will be engaged with the shafts 66 and 65, turning the shafts 66 and 67 in opposite directions, and due to their threaded portion, moving the arms 36 outwardly, this motion being transmitted to the sleeves 40, obviously projects the spur bars outwardly so as to engage with the surface over which the wheels are passing, and conversely, when the lever 80 is moved inwardly or toward the seat, an opposite effect is obtained so that the bars are retracted, permitting the wheel to run as usual upon the cushion elements.

Due to the relatively short lengths of the threaded portions 76 and 77, should the lever 80 be operated so as to cause excessive movement of the transverse shafts 66 and 67, no damage will be done, as the threaded hubs 37 will merely run off the screws which will rotate freely therein until the lever is moved in the opposite direction, whereupon the force of the spring tends to urge the threaded hubs to engage with the threaded portion of the shafts, causing the same to compress the springs upon the opposite side.

From the foregoing it will be seen that an effective and practical operating device has been presented whereby vehicle wheels of the class described may be provided with spurs readily extensible or retractable so that the wheels will operate in an efficient manner.

Having thus described my invention and set forth the manner of its application, construction and use what I claim as new and desire to secure by Letters Patent, is:—

1. In an extensible spurred wheel, the combination with the driving wheels of a vehicle having pairs of cushion tires upon their periphery, of a plurality of radial bars movable in said wheel, said bars having spurred outer ends, slide bars movable in the hub of said wheel, connections between said slide and spur bars, sleeves engageable with said sliding bars, means for normally holding said sleeves in position to retract said bars, means operated by the driving shaft of a vehicle for actuating said sleeves, and means carried at the front of said vehicle for connecting or disconnecting said operating means whereby the projection or retraction of said spurred bars may be controlled.

2. In an extensible spurred wheel, the combination with the body of a vehicle, a driving shaft mounted therein, connections between said driving shaft and the rear axle thereof, a pair of driving wheels on said axle, and cushions tires arranged in pairs upon each of said wheels, of spurred elements arranged radially in said wheel adapted to project outwardly between said pairs of cushion tires, a pair of beveled gears on said driving shaft, transverse shafts arranged in the plane of said axle, gears on said transverse shafts engageable with the gears on said driving shaft, a clutch mechanism operated from the front of said vehicle whereby either pair of said gears may be engaged, screw threads formed on the outer ends of said transverse shafts, arms engageable by said threads, means adapted to force said arms upon said threads when the latter rotate in the proper direction, and operative connections whereby said screws are caused to project or retract said spurred elements.

In testimony whereof I have affixed my signature.

ANDREW NOVOMIROFF.